United States Patent [19]

Strammello

[11] Patent Number: 4,499,495
[45] Date of Patent: Feb. 12, 1985

[54] SWITCHING DIPLEXER FOR SINGLE ANTENNA INPUT TELEVISION RECEIVERS

[75] Inventor: Peter Strammello, Arlington Heights, Ill.

[73] Assignee: Zenith Electronics Corporation, Glenview, Ill.

[21] Appl. No.: 401,449

[22] Filed: Jul. 26, 1982

[51] Int. Cl.³ .............................................. H04N 5/44
[52] U.S. Cl. .................. 358/188; 358/191.1; 455/176; 455/180; 455/191
[58] Field of Search ..................... 358/188, 191.1, 181; 455/176, 180, 188–191, 286, 290, 334, 338; 343/702, 720; 333/100, 101, 103, 104, 109, 110, 126, 129, 132, 174

[56] References Cited

U.S. PATENT DOCUMENTS 4,118,679 10/1978 Hiday et al. ..................... 455/180
4,326,295 4/1982 Matsumoto et al. ............... 455/176
4,379,271 4/1983 Lehmann ........................... 455/188
4,404,686 9/1983 Moon ................................. 455/180

Primary Examiner—John C. Martin
Assistant Examiner—Michael D. Parker

[57] ABSTRACT

The VHF and UHF tuners of a television receiver are coupled by a switchable diplexing circuit to a single antenna input terminal. The diplexing circuit includes a first electronic switching means responsive to a U/V bandswitch control signal connected between the UHF tuner and the antenna input terminal. A switchable low-pass filter is connected between the VHF tuner and the antenna input terminal, the switchable low-pass filter including a second electronic switching means responsive to the U/V bandswitch control signal for causing the low-pass filter to exhibit a first low-pass frequency response having a cut-off frequency fc in the VHF mode and a second low-pass frequency responsive having a cut-off frequency less then fc in the UHF mode.

9 Claims, 6 Drawing Figures

SWITCHING DIPLEXER FOR SINGLE ANTENNA INPUT TELEVISION RECEIVERS

BACKGROUND OF THE INVENTION

The present invention relates generally to television receivers of the type having VHF and UHF tuners and, more particularly, concerns a novel switching circuit for coupling the VHF and UHF tuners of a television receiver to a single antenna input terminal.

Television receivers conventionally include both VHF and UHF tuners, each adapted for tuning a respective band of television signal frequencies. The VHF tuner, for example, is typically designed for tuning the VHF television signal frequencies including the low-VHF band from 54 to 88 MHz and the high VHF band from 174 to 213 Mhz. In addition, many current VHF tuners are also adapted for tuning portions of the cable television (CATV) signal frequency spectrum including the CATV mid-band from 100 to 174 MHz, the CATV superband from 216 to 300 MHz and the CATV hyperband from 300 to nearly 400 MHz. The UHF tuner is typically designed for tuning the UHF television signal frequency spectrum between 470 and 890 MHz.

Television receivers having both VHF and UHF tuners have conventionally been designed with two separate antenna input terminals, a VHF input terminal for coupling the VHF/CATV band television signal frequencies to the VHF tuner and a UHF antenna input terminal for coupling the UHF band of television signal frequencies to the UHF tuner. In the case where separate VHF and UHF antennas are used to receive broadcast VHF and UHF television signals, the VHF antenna is connected to the VHF antenna input terminal and the UHF antenna is connected to the UHF antenna input terminal. On the other hand, in the case where a single antenna is used to receive both VHF and UHF television signals, a diplexer is typically connected between the antenna and the television receiver to separate the received VHF and UHF signals for application to the respective antenna input terminals of the receiver. A conventional prior art diplexer of the foregoing type is shown in FIG. 1. The diplexer includes an input terminal 10 coupled to a low-pass filter section 12 and a high-pass filter section 14. The low-pass filter section 12 of the diplexer exhibits a frequency response as represented by curve 16 of FIG. 2 for passing the received VHF signal frequencies to the VHF tuner and the high-pass section 14 exhibits a frequency response as represented by curve 18 for passing the received UHF signal frequencies to the UHF tuner.

It would be desirable to avoid the use of diplexers by providing a television receiver with a single antenna input terminal for connection directly to a combination VHF/UHF antenna and separating the VHF and UHF signal frequencies internally within the receiver for application to the VHF and UHF tuners. Due to the ever increasing encroachment of the upper end of the CATV frequency spectrum on the lower end of the UHF frequency spectrum, to a point where little or no frequency separation exists therebetween, the use of such a single antenna input terminal would provide the added advantage that the UHF tuner could be used to tune the higher frequency CATV channels thereby allowing for the channel capacity of the CATV system to be greatly increased.

To make the use of a television receiver in the foregoing manner practicable a suitable diplexing circuit must be provided between the single antenna input terminal and the VHF and UHF tuners of the receiver to appropriately separate the broadcast signals, whether received over-the-air or through a cable. One approach to providing such a diplexing circuit would be to use a conventional diplexer of the type illustrated in FIG. 1 to selectively couple the received television signals to the VHF and UHF tuners. With reference to FIG. 2, it will be noted that the frequency response characteristics of the prior art diplexer of FIG. 1 exhibit a considerable overlap between the low and high-pass curves 16 and 18 in the region of the frequency spectrum identified by reference numeral 20. This overlap in the response characteristics of the filter sections 12 and 14 poses no problem when the diplexer is used as intended since no television signals are broadcast over-the-air in frequency spectrum region 20. However, the overlapping response characteristics would prevent the diplexer from being used as contemplated herein since received CATV signals in the frequency spectrum region 20 would be subject to excessive insertion losses upon being coupled to either the VHF or UHF tuner.

The insertion loss problem characterizing the passive splitter design described above can be eliminated to some extent through the use of an active switching circuit as illustrated in FIG. 3. In this switching circuit, an active switching element 22, e.g. a switching diode, is connected between the single antenna input terminal 10 and the UHF tuner and a series of three switching elements 24, 26 and 28, which may also be switching diodes, are connected between antenna input terminal 10 and the VHF tuner. In the VHF mode, a U/V bandswitch control signal generated by the channel selector (not shown) causes switching elements 24 and 28 to assume a conductive state and switching elements 22 and 26 a non-conductive state as shown. As a consequence, substantially all of the signals received at input terminal 10 are coupled to the VHF tuner which tunes the particular channel designated by the channel selector. It has been found preferable to incorporate a 54 MHz high-pass filter 30 between antenna input terminal 10 and the switching circuit to protect the switching elements from strong out-of-band interference such as amateur radio transmissions and low frequency signal spikes caused by lightning. In the UHF mode of operation, the U/V bandswitch control signal generated by the channel selector causes switching elements 22 and 26 to assume a conductive state and switching elements 24 and 28 a non-conducting state. In this configuration, substantially all of the received signals are coupled to the UHF tuner which tunes the particular channel designated by the channel selector, with the switching elements 26 and 28 serving to provide additional necessary isolation from the VHF tuner. While the foregoing switching circuit is believed to provide adequate performance, it requires the use of a relatively complex and costly circuit, including, for example, four switching diodes and a high-pass filter, and is therefore not especially suited for use in mass produced consumer electronic products.

It is therefore an object of the present invention to provide an improved switchable diplexing circuit selectively operable for coupling received television signals from a single antenna input terminal of a television receiver to either the VHF or UHF tuner of the receiver without excessive insertion loss.

It is a further object of the invention to provide a switchable diplexing circuit of the foregoing type which is relatively inexpensive, preferably incorporating no more than two active switching elements while providing adequate isolation between the VHF and UHF tuners of the receiver.

BRIEF DESCRIPTION OF THE DRAWINGS

The features of this invention which are believed to be novel are set forth with particularity in the appended claims. The invention together with its objects and the advantages thereof, may be best understood by reference to the following description taken in conjunction with the accompanying drawings, in which like reference numerals identify like elements in the several figures and in which:

DESCRIPTION OF THE PREFERRED EMBODIMENTS

Figure 1:
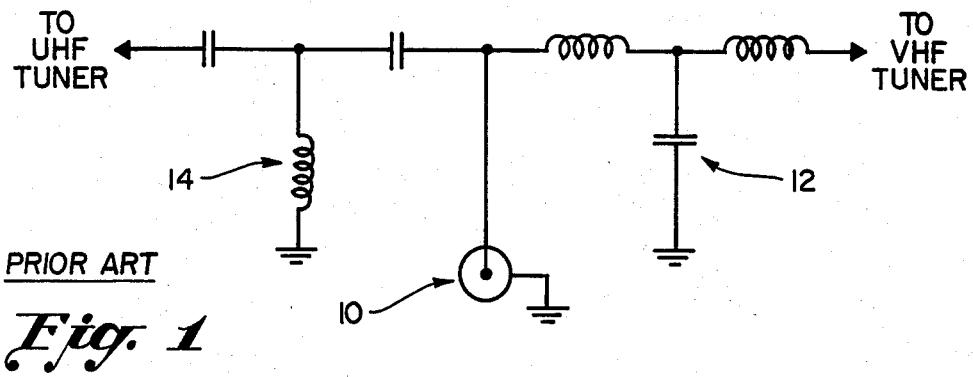
FIG. 1 is a schematic diagram of a prior art passive signal splitter used to separate received VHF and UHF television signal frequencies.
Figure 2:
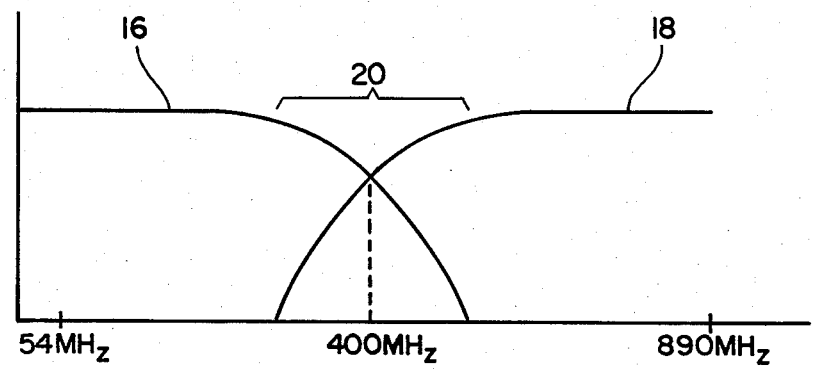
FIG. 2 is a graphical representation of the frequency response characteristics of the two filter sections of the passive splitter shown in FIG. 1.
Figure 3:
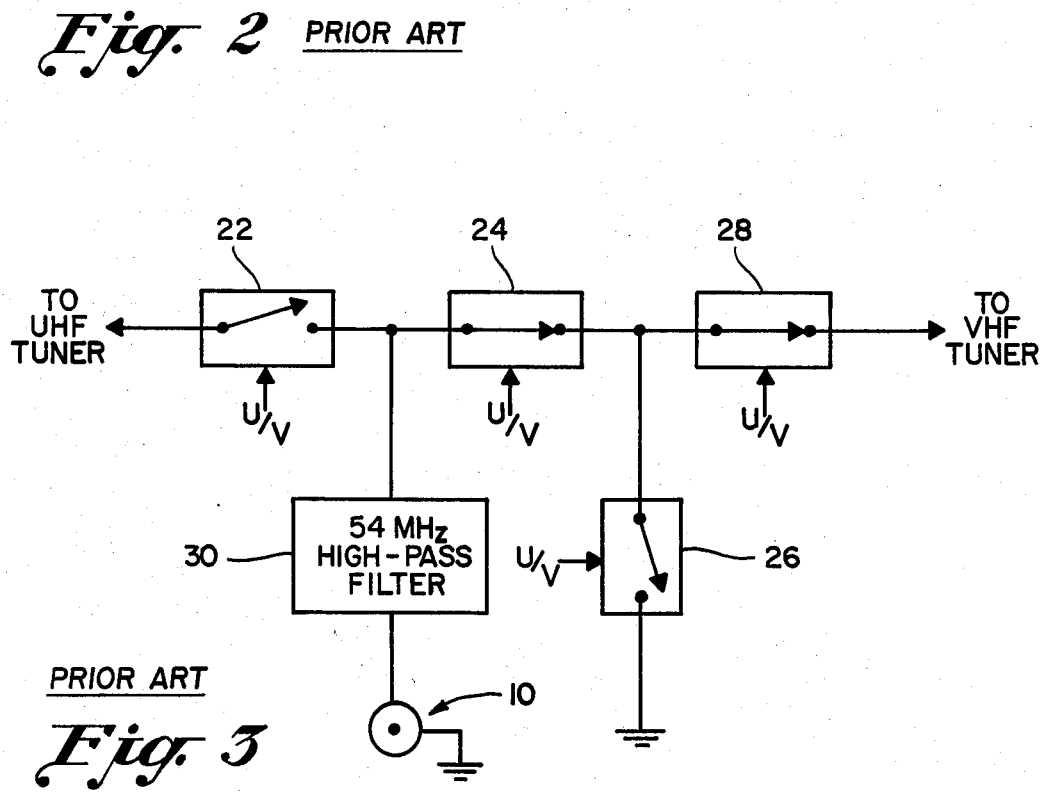
FIG. 3 is a block diagram illustrating an electronic switching circuit operable for selectively coupling television signals received at a single input terminal to the VHF and UHF tuners of a television receiver.
Figure 4:
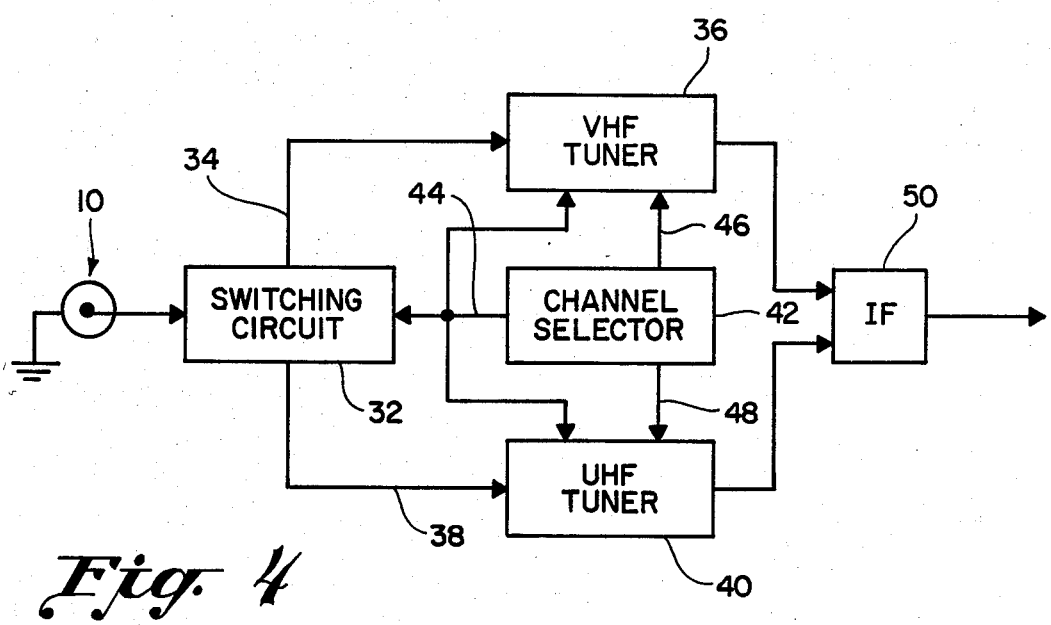
FIG. 4 is a block diagram partially illustrating a television receiver having a switching circuit connected between a single antenna input terminal and the VHF and UHF tuners of the receiver.

Referring to the drawings, FIG. 4 illustrates the manner in which the switching diplexer of the present invention is used in a television receiver. The television receiver includes a single antenna input terminal 10 adapted for receiving RF television signals from a combination VHF/UHF antenna or from a cable television distribution system. The received television signals are coupled from antenna input terminal 10 to the switching diplexer of the invention which is identified by reference numeral 32. Switching diplexer 32 has a first output 34 connected to the input of the VHF tuner 36 of the television receiver and a second output 38 connected to the UHF tuner 40 of the television receiver. A conventional channel selector 42 includes a first output 44 developing a U/V bandswitch control signal for selectively enabling either VHF tuner 36 or UHF tuner 40 in accordance with the selected television channel, the U/V bandswitch control signal also controlling the operation of switching diplexer 32 for directing the television signals received at antenna input terminal 10 to the enabled one of tuners 36 and 40. Channel selector 42 further includes second and third outputs 46 and 48 for coupling tuning voltage signals to tuners 36 and 40 respectively for tuning the particular channel designated by the channel selector. The outputs of tuners 36 and 40 are coupled to a conventional IF stage 50 of the television receiver and therefrom to the remaining circuits of the receiver for further processing.

As described previously, the general arrangement illustrated in FIG. 4 is advantageous from the standpoint of not requiring the use of an external signal splitter necessary in television receivers having separate VHF and UHF antenna input terminals. In addition, the arrangement facilitates the use of the UHF tuner to tune the high end of the CATV frequency spectrum which has heretofore not been possible in television receivers having separate VHF and UHF antenna input terminals since the CATV signals are coupled only to the VHF antenna input terminal for application to the VHF tuner. However, in order to make the circuit arrangement of FIG. 4 practicable, a switching diplexer must be provided which is both relatively inexpensive and characterized by minimal insertion loss especially when the television receiver is operated in the UHF mode.

Figure 5:
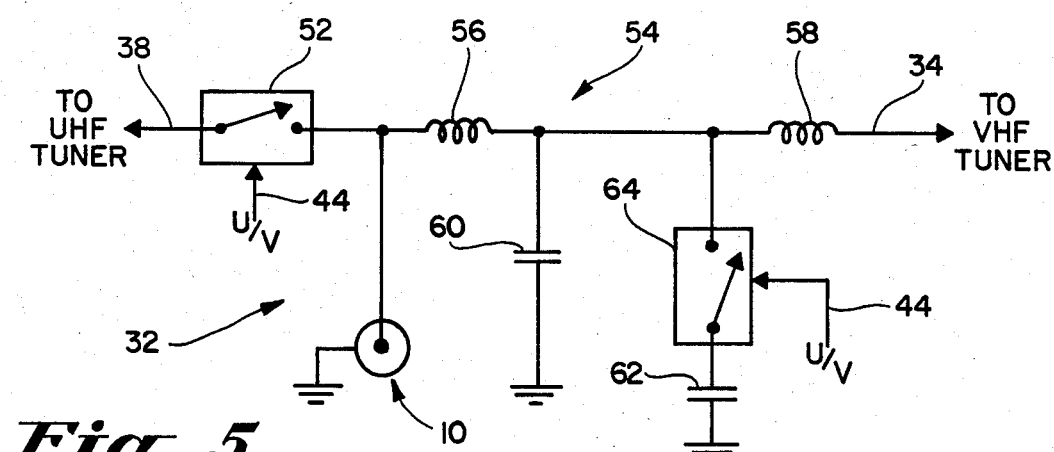
FIG. 5 is a partly schematic and partly block diagram illustrating a switching circuit according to the invention for use in the block diagram of FIG. 4.
Figure 6:
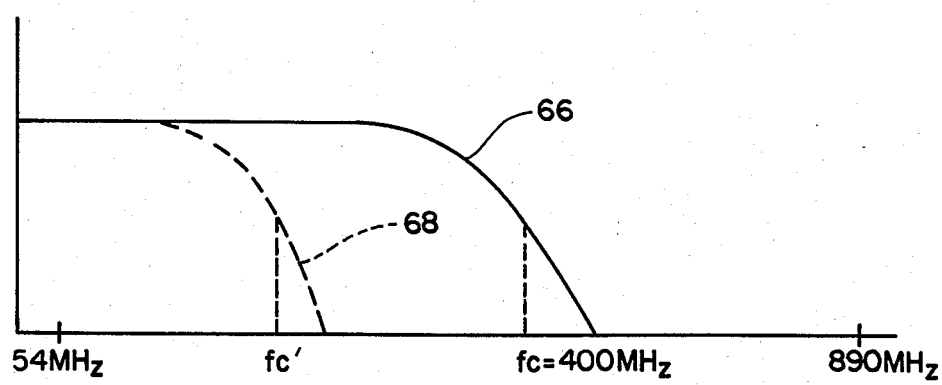
FIG. 6 is a graphical representation of the frequency response characteristics of the switching circuit of FIG. 5.

The present invention achieves the foregoing objectives through the provision of a switching diplexer as illustrated in FIG. 5. The switching diplexer shown in FIG. 5 includes a first switching element 52, e.g. a switching diode, connected between antenna input terminal 10 and UHF tuner 40. The state of switching element 52, i.e. conductive or non-conductive, is controlled by the level of the U/V bandswitch control signal supplied by channel selector 42 on line 44. Antenna input terminal 10 is also connected to the VHF tuner 36 through a switchable low-pass filter 54. Switchable low-pass filter 54 comprises a pair of series inductors 56 and 58 and a pair of shunt capacitors 60 and 62, capacitor 62 being connected in series with a second switching element 64 which also preferably comprises a switching diode whose state is controlled by the U/V bandswitch control signal supplied by channel selector 42 on line 44. It will be recognized that when switching element 64 is in a non-conductive state as shown in the drawing (the VHF mode of operation) switchable filter forms a low-pass filter consisting of inductors 56 and 58 and capacitor 60. The values of inductors 56 and 58 and capacitor 60 are selected such that the response of the thusly formed low-pass filter, represented by curve 66 of FIG. 6, establishes a desired cut-off frequency fc (e.g. about 400 MHz) whereby all of the received television signals intended to be tuned by the VHF tuner 36 are coupled thereto by the filter. When switching element 64 assumes a conductive state in response to the U/V bandswitch control signal (the UHF mode of operation), capacitor 62 is connected in parallel across capacitor 60 and establishes a second low-pass frequency response, represented by dotted line curve 68 of FIG. 6, having a cut-off frequency fc' (e.g. about 200 MHz) which is lower than fc. As a result, signal frequencies above the cut-off frequency fc' are allowed to be delivered to the UHF tuner, switching element 52 being in a conductive state, with minimal insertion loss and with adequate isolation from the VHF tuner 36.

In operation, assume that a channel intended to be tuned by VHF tuner 36 is selected by channel selector 42. Channel selector 42 will develop an appropriate U/V bandswitch control signal on line 44 for enabling only VHF tuner 36 and a tuning voltage on line 46 for tuning the selected channel. The bandswitch control signal on line 44 will also place switching diplexer 32 in its VHF mode of operation wherein both switching elements 52 and 64 are non-conductive thereby causing switchable low-pass filter 54 to exhibit the response characteristic represented by curve 66 of FIG. 6. As a consequence, all received signal frequencies below cutoff frequency fc, including the selected channel frequency, are passed to VHF tuner 36 with non-conducting switching element 52 providing adequate isolation from the UHF tuner 40. The tuned television signal will subsequently be coupled from VHF tuner 36 to IF section 50 for further processing by the television receiver.

If a channel intended to be tuned by UHF tuner 40 is selected by channel selector 42, a U/V bandswitch control signal is developed on line 44 for enabling only the UHF tuner 40 and a tuning voltage is developed on line 48 for tuning the selected channel. The bandswitch control signal on line 44 will also place switching diplexer 32 in its UHF mode of operation wherein both switching elements 52 and 64 are conductive thereby causing the switchable low-pass filter 54 to exhibit the response characteristic represented by curve 68 of FIG. 6. As a consequence, only those received signal frequencies below cut-off frequency fc' are passed to VHF tuner 36, the remaining received signals above cut-off frequency fc' being passed through conductive switching element 52 to the UHF tuner 40 with low-pass filter 54 providing adequate isolation from the VHF tuner 36. The tuned television signal will subsequently be coupled from UHF tuner 40 to IF section 50 for further processing by the television receiver.

What has thus been shown is a novel switching diplexer circuit enabling the use of a single antenna input terminal for supplying both the VHF and UHF tuners of a television receiver. The diplexing circuit achieves adequate isolation between the VHF and UHF tuners of the receiver while requiring the use of only two switching elements, neither of which are active in the VHF mode thereby obviating the need for an input high-pass filter.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

What is claimed is:

1. In a television receiver selectively operable in a first mode for enabling a first tuning means for tuning a first band of television signal frequencies and in a second mode for enabling a second tuning means for tuning a second band of television signal frequencies having a higher frequency content than said first band, an antenna interface circuit comprising:
   an input terminal for receiving RF television signals broadcast over said first and second frequency bands;
   switching means for coupling said input terminal to said second tuning means in said second mode of operation and for decoupling said input terminal from said second tuning means in said first mode of operation; and
   lowpass filter means coupled between said input terminal and said first tuning means, said lowpass filter means having a first cutoff frequency in said first mode of operation for coupling said first band of signal frequencies to said first tuning means in substantially unattenuated form and having a second lower cutoff frequency in said second mode of operation for facilitating coupling by said switching means of said second band of signal frequencies to said second tuning means in substantially unattenuated form.

2. An antenna interface circuit according to claim 1 wherein said lowpass filter means comprises a pair of series connected inductors coupled between said input terminal and said first tuning means, a first shunt capacitor connected between said inductors and a shunt circuit connected in parallel with said first shunt capacitor, said shunt circuit comprising a second capacitor connected in series with a second switching means.

3. An antenna interface circuit according to claim 2 wherein said television receiver includes a channel selection means for developing a first control signal for enabling said first tuning means in said first mode of operation and for developing a second control signal for enabling said second tuning means in said second mode of operation, said first control signal rendering said first and second switching means non-conductive and said second control signal rendering said first and second switching means conductive.

4. An antenna interface circuit according to claim 1 wherein said first and second tuning means comprise VHF and UHF tuners respectively and wherein said first and second bands of television signal frequencies comprise contiguous VHF/CATV and UHF bands respectively, the first and second cutoff frequencies of said lowpass filter means comprising about 400 MHz and 200 MHz respectively.

5. In a television receiver selectively operable in a VHF/CATV mode for enabling a VHF tuner for tuning a VHF/CATV band of television signal frequencies and in a UHF mode for enabling a UHF tuner for tuning a UHF band of television signal frequencies contiguous with said VHF/CATV band of frequencies, an antenna interface circuit comprising:
   an input terminal for receiving RF television signals broadcast over said VHF/CATV and UHF bands;
   switching means for coupling said input terminal to said UHF tuner in said UHF mode of operation and for decoupling said input terminal from said UHF tuner in said VHF/CATV mode of operation; and
   lowpass filter means coupled between said input terminal and said VHF tuner, said lowpass filter means having a first cutoff frequency in said VHF/CATV mode of operation for coupling said VHF/CATV band of signal frequencies to said VHF tuner in substantially unattenuated form and having a second lower cutoff frequency in said UHF mode of operation for facilitating coupling by said switching means of said UHF band of signal frequencies to said UHF tuner in substantially unattenuated form.

6. An antenna interface circuit according to claim 5 wherein said first and second cutoff frequencies of said lowpass filter means comprise about 400 MHz and 200 MHz respectively.

7. An antenna interface circuit according to claim 6 wherein said lowpass filter means comprises a pair of series connected inductors coupled between said input terminal and said VHF tuner, a first shunt capacitor connected between said inductors and a shunt circuit connected in parallel with said first shunt capacitor, said shunt circuit comprising a second capacitor connected in series with a second switching means.

8. An antenna interface circuit according to claim 7 wherein said television receiver includes a channel selection means for developing a first control signal for enabling said VHF tuner in said VHF/CATV mode of operation and a second control signal for enabling said UHF tuner in said UHF mode of operation, said first control signal rendering said first and second switching means non-conductive and said second control signal rendering said first and second switching means conductive.

9. In a television receiver having a VHF tuner for tuning a VHF/CATV band of television signal frequencies, a UHF tuner for tuning a UHF band of television signal frequencies contiguous with said VHF/CATV band, and channel selection means selectively operable for developing a first control signal for enabling said VHF tuner and a second control signal for enabling said UHF tuner, an antenna interface circuit comprising:

an input terminal for receiving RF television signals broadcast over said VHF/CATV and UHF bands;

switching means responsive to said second control signal for assuming a conductive state for coupling said input terminal to said UHF tuner and responsive to said first control signal for assuming a non-conductive state for decoupling said input terminal from said UHF tuner; and lowpass filter means comprising a pair of series connected inductors coupled between said input terminal and said VHF tuner, a first shunt capacitor connected between said inductors and a shunt circuit connected in parallel with said first shunt capacitor, said shunt circuit comprising a second capacitor connected in series with a second switching means, said second switching means being responsive to said first control signal for assuming a non-conductive state such that a first cutoff frequency is established for said lowpass filter means for coupling said VHF/CATV band of signal frequencies to said VHF tuner in substantially unattenuated form and being responsive to said second control signal for assuming a conductive state such that a second lower cutoff frequency is established for said lowpass filter means for facilitating coupling by said switching means of said UHF band of signal frequencies to said UHF tuner in substantially unattenuated form.

* * * * *